(No Model.)
C. D. MILNE.
HANDLE FOR VESSELS.
No. 499,341. Patented June 13, 1893.
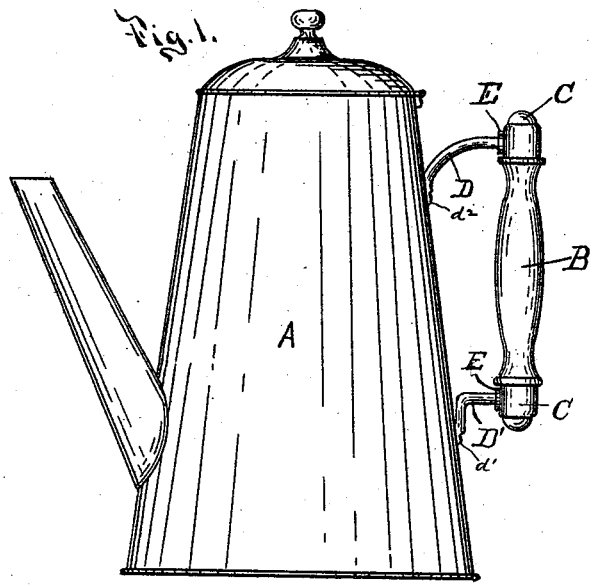
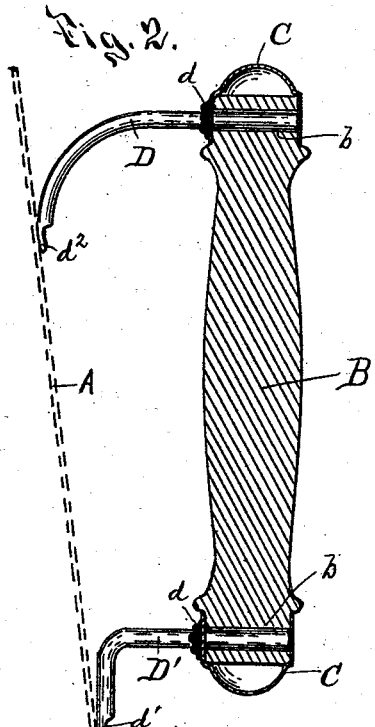
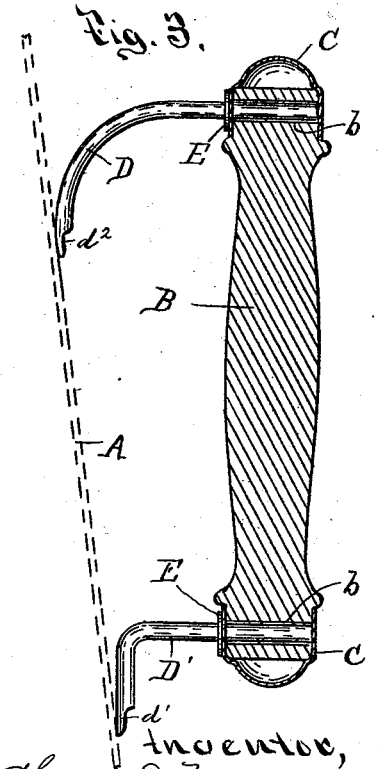
Witnesses;
H. N. Bates.
M. W. McRoden.
Inventor,
Charles D Milne
By Howard L. Osgood
Att'y.

UNITED STATES PATENT OFFICE.

CHARLES D. MILNE, OF ROCHESTER, NEW YORK, ASSIGNOR OF ONE-HALF TO ALBERT R. PRITCHARD, OF SAME PLACE.

HANDLE FOR VESSELS.

SPECIFICATION forming part of Letters Patent No. 499,341, dated June 13, 1893.

Application filed April 5, 1893. Serial No. 469,218. (No model.)

*To all whom it may concern:*

Be it known that I, CHARLES D. MILNE, a citizen of the United States, and a resident of the city of Rochester, in the county of Monroe and State of New York, have invented certain new and useful Improvements in Handles for Vessels, of which the following is a specification, reference being had to the accompanying drawings, in which—

Figure 1, is a side elevation of a vessel having one of my handles attached thereto. Fig. 2, is a side elevation partly in section, of one of my handles. Fig. 3, is a like view of one of my handles showing a variation in construction.

The object of my invention is to provide a strong, cheap and easily constructed non-conducting handle for vessels, and particularly for such vessels as metallic tea pots and coffee pots and it consists in the combination of parts hereinafter described and claimed.

In the drawings, A represents the vessel to which the handle is attached.

B represents a non-conducting handle proper, formed of wood or other suitable material.

C C represent closed caps or ferrules on the ends of said handle proper B.

D D' represent wire arms forming the means of connecting the handle proper to the vessel A; and E E represent washers upon the wire arms adjacent to the ferrules C C.

The handle proper B is first enameled or japanned over its entire surface. The enamel or japan is water-proof in character. The ferrules or caps C C are next placed upon the ends of said handle and are pressed thereon so as to fit tightly in the proper positions. After the ferrules C C are in place a transverse hole $b$ is bored through the side of each ferrule and into the handle proper, but without perforating the opposite side of the ferrule. Wire arms D and D' of suitable diameter and bent into suitable form to be properly attached to the vessel A are inserted through the holes $b\ b$, but need not fit very tightly therein. Solder $d\ d$ (Fig. 2) fixes the wire arms firmly to the ferrules. The handle is now in condition to be soldered or riveted to the vessel A, and, when so fastened to the vessel, the whole vessel is ready for the usual plating bath. The form shown in Figs. 1 and 3, has washers E E upon the wire arms closely adjacent to the ferrules C C, at the point where the arm passes through the perforation $b$ in the side of the ferrule. Solder is run between the ferrule C and the washer E, thereby fastening the washer E to the wire D and to the cap or ferrule C. The angles at which the arms D D' are bent may, of course, be varied to suit the particular circumstances, and their ends $d'\ d^2$ may be set in opposite directions instead of in the same direction. By this arrangement of parts I produce a non-conducting handle for vessels which is easy to construct; the wire arms D D' may be made of uniform size and shape and by insertion into the holes $b\ b$, are set in an exact position, so that the handles may be manufactured in large quantities and no adjustment by hand is necessary in order that the handle proper B shall be vertical when attached to the vessel for which it is made. The handle thus constructed is water proof and cannot be injured by immersion in the plating bath as there is no aperture for access of fluid to any unenameled surface of the handle proper. Hence the handle is not liable to crack by swelling and remains as dry in its interior at all times as when it was first enameled or japanned. The handle is strongly braced and no heat can be conducted from the vessel to the handle proper.

What I claim is—

1. In a handle for vessels, a handle proper, a closed cap or ferrule upon each end thereof, a wire arm of suitable curvature passing through one side of each cap and through a transverse perforation in the handle proper and fastened to said cap as by solder at the point where the arm passes into the same, substantially as described.

2. In a handle for vessels, a handle proper, a closed cap or ferrule upon each end thereof, wire arms of suitable curvature passing through one side of each cap and through transverse perforations in the handle proper, and provided with washers resting against said caps, said washers, arms and caps being fastened together as by solder, substantially as described.

CHARLES D. MILNE.

Witnesses:
E. B. FENNER,
H. L. OSGOOD.